(12) United States Patent
Mukherjee (10) Patent No.: US 10,898,890 B2
(45) Date of Patent: Jan. 26, 2021

(54) PHOTOCATALYTIC COATING AND METHOD OF MAKING SAME

(71) Applicant: NITTO DENKO CORPORATION, Osaka (JP)

(72) Inventor: Rajesh Mukherjee, Irvine, CA (US)

(73) Assignee: NITTO DENKO CORPORATION, Osaka (JP)

(*) Notice: Subject to any disclaimer, the term of this patent is extended or adjusted under 35 U.S.C. 154(b) by 652 days.

(21) Appl. No.: 15/507,714

(22) PCT Filed: Aug. 28, 2015

(86) PCT No.: PCT/US2015/047587
§ 371 (c)(1),
(2) Date: Feb. 28, 2017

(87) PCT Pub. No.: WO2016/033554
PCT Pub. Date: Mar. 3, 2016

(65) Prior Publication Data
US 2017/0291169 A1    Oct. 12, 2017

Related U.S. Application Data

(60) Provisional application No. 62/043,930, filed on Aug. 29, 2014.

(51) Int. Cl.
*B01J 23/00* (2006.01)
*B01J 35/00* (2006.01)
(Continued)

(52) U.S. Cl.
CPC .......... *B01J 35/004* (2013.01); *B01J 21/063* (2013.01); *B01J 23/30* (2013.01); *B01J 23/72* (2013.01);
(Continued)

(58) Field of Classification Search
CPC ...... B01J 35/004; B01J 37/343; B01J 37/344; B01J 37/0215; B01J 23/72; B01J 23/30; B01J 21/063; C23C 18/1245; C23C 18/1283; C23C 18/122; C23C 18/127; C23C 18/1225; C23C 18/04; C09D 1/00; B05D 3/108; B32B 2255/20
(Continued)

(56) References Cited

U.S. PATENT DOCUMENTS 5,656,555 A    8/1997  Cho
5,665,849 A    9/1997  Cho
(Continued)

FOREIGN PATENT DOCUMENTS

CN    102872852 A    1/2013
CN    103635259 A    3/2014
(Continued)

OTHER PUBLICATIONS

U.S. Appl. No. 60/635,570, filed 2004.*
(Continued)

*Primary Examiner* — Haytham Soliman
(74) *Attorney, Agent, or Firm* — K&L Gates LLP; Louis C. Cullman; Hal Gibson (57) ABSTRACT

Described herein are methods for coating a substrate with a photocatalytic compound, and photocatalytic elements prepared by these methods.

10 Claims, 2 Drawing Sheets

(51) Int. Cl.

| | | |
|---|---|---|
| *B01J 21/06* | (2006.01) | |
| *B01J 23/30* | (2006.01) | |
| *B01J 23/72* | (2006.01) | |
| *B01J 37/02* | (2006.01) | |
| *B01J 37/34* | (2006.01) | |
| *C23C 18/12* | (2006.01) | |
| *B05D 3/10* | (2006.01) | |
| *C09D 1/00* | (2006.01) | |
| *C23C 18/04* | (2006.01) | |

(52) U.S. Cl.
CPC ......... *B01J 37/0215* (2013.01); *B01J 37/343* (2013.01); *B01J 37/344* (2013.01); *B05D 3/108* (2013.01); *C09D 1/00* (2013.01); *C23C 18/122* (2013.01); *C23C 18/127* (2013.01); *C23C 18/1225* (2013.01); *C23C 18/1245* (2013.01); *C23C 18/1283* (2013.01); *B32B 2255/20* (2013.01); *C23C 18/04* (2013.01)

(58) Field of Classification Search
USPC ........................................................ 502/350
See application file for complete search history.

(56) References Cited

U.S. PATENT DOCUMENTS

| | | | |
|---|---|---|---|
| 5,849,200 A | 12/1998 | Heller et al. | |
| 5,854,169 A | 12/1998 | Heller et al. | |
| 6,093,676 A | 7/2000 | Heller et al. | |
| 6,586,758 B2 * | 7/2003 | Martin | G21F 5/018 250/515.1 |
| 7,489,537 B2 * | 2/2009 | Tran | H01L 45/16 365/151 |
| 8,003,563 B2 | 8/2011 | Sato et al. | |
| 8,017,238 B2 | 9/2011 | Ohtani et al. | |
| 9,376,332 B2 | 6/2016 | Sambandan et al. | |
| 2003/0055193 A1 | 3/2003 | Lichtenhan et al. | |
| 2004/0229158 A1 | 11/2004 | Meador et al. | |
| 2006/0204192 A1 | 9/2006 | Satake et al. | |
| 2007/0032091 A1 * | 2/2007 | Heald | H01L 21/28008 438/758 |
| 2009/0012317 A1 | 1/2009 | Laine et al. | |
| 2009/0221778 A1 | 9/2009 | Muramatsu et al. | |
| 2009/0226609 A1 | 9/2009 | Boisvert et al. | |
| 2010/0137506 A1 | 6/2010 | Tomiyama et al. | |
| 2011/0034038 A1 | 2/2011 | Chen et al. | |
| 2012/0219793 A1 | 8/2012 | Fritz et al. | |
| 2013/0180932 A1 | 7/2013 | Fukumura et al. | |
| 2013/0337642 A1 | 12/2013 | Chen et al. | |
| 2014/0206182 A1 | 7/2014 | Chen et al. | |
| 2015/0024925 A1 | 1/2015 | Maclaughlin et al. | |
| 2015/0072136 A1 | 3/2015 | Maclaughlin et al. | |

FOREIGN PATENT DOCUMENTS

| | | | |
|---|---|---|---|
| CN | 103991921 A | 8/2014 | |
| WO | 2011/059967 A2 | 5/2011 | |
| WO | 2013/126958 A1 | 9/2013 | |
| WO | WO-2013126957 A1 * | 9/2013 | ............... C09D 1/00 |
| WO | 2016/033554 A1 | 3/2016 | |

OTHER PUBLICATIONS

Product Information Flowable Oxides FEATURES @BULLET State-of-the-art planarization @BULLET Low Dielectric Constant @BULLET Controlled Film Thickness @BULLET Excellent Gap Fill @BULLET Very low defect density @BULLET Choice of Carrier Solvent Systems. Jan. 14, 2005. Retrieved from the Internet: URL:http://www.dowcorning.co.kr/ko_KR/content/publishedlit/10-713A-01.pdf [retrieved by Office on Oct. 30, 2015].

International Search Report and Written Opinion for International PCT Application Application Serial No. PCT/US2015/047587 filed on Aug. 28, 2015.

Liu et al., Cu(II) Oxide Amorphous Nanoclusters Grafted Ti3+ Self-Doped TiO2 : An Efficient Visible Light Photocatalyst. Chemistry of Materials, vol. 23, No. 23, pp. 5282-5286 (2011).

Asahi et al., Visible-Light Photocatalysts in Nitrogen-Doped Titanium Oxides. Science, vol. 293, Issue 5528, pp. 269-271 (2001).

Abe et al., Pristine Simple Oxides as Visible Light Driven Photocatalysts: Highly Efficient Decomposition of Organic Compounds over Platinum-Loaded Tungsten Oxide. Journal of American Chemical Society, 130(25) : 7780-7781 (2008).

Office Action for Chinese Patent Application No. 2015800462408 dated Jan. 17, 2019.

Office Action, dated Jul. 29, 2020, in the corresponding Chinese Patent Application No. 201580046240.8 (original and English translation enclosed).

* cited by examiner

FIG. 4

PHOTOCATALYTIC COATING AND METHOD OF MAKING SAME

CROSS REFERENCE TO RELATED APPLICATIONS

This application is a national phase of PCT/US2015/047587 filed on Aug. 28, 2015 which claims priority to U.S. 62/043,930 filed on Aug. 29, 2014, the entire disclosures of which are incorporated by reference.

BACKGROUND

Field

Some embodiments are related to a process for producing a substrate coated with a photocatalytic film containing an inorganic binder.

Description of the Related Art

Visible light activated photocatalysts can be deployed for self-cleaning, air and water purification, and many other interesting applications usually without any post-deployment, non-renewable energy costs. This is because the photocatalysts are able to decompose pollutants (like dyes, volatile organic compounds and $NO_x$) using available ambient light (like solar radiation or indoor and outdoor lighting). With the anticipated rapid adoption of UV-free indoor lighting (like LEDs and OLEDs), it would be useful to find ways to deploy visible-light activated photocatalysts in indoor applications, for instance in cleaning room air; in domestic, public and commercial spaces; and especially in confined areas like aircraft, public buildings, etc. Moreover, additional applications for antibacterial surfaces and self-cleaning materials can have wide applicability in the food service, transportation, health care and hospitality sectors.

SUMMARY

In some embodiments, a method for making a photocatalytic element is described.

Some embodiments include a method for making a photocatalytic element comprising: coating a substrate with an inorganic silicon oxide precursor solution, comprising a silsesquioxane having predominantly cage form characteristics, and a solvent; a first curing of the coated substrate at a temperature sufficient to remove the solvent and retain silsesquioxane cage form characteristics; coating the coated substrate with a dispersion comprising a photocatalytic material to form a plural coated substrate; and a second curing of the plural coated substrate at a temperature sufficient to immobilize at least a portion of the photocatalytic material above the surface of the coated substrate; wherein at least some of the silsesquioxane is converted to create a silicon dioxide interface with the substrate as a result of the first curing or the second curing. Some embodiments include a photocatalytic element prepared by this method.

Some embodiments include a photocatalytic element comprising: a substrate; an intermediate layer comprising a silsesquioxane and silicon dioxide; and a photocatalytic layer comprising a photostable inorganic photocatalyst; wherein the intermediate layer is disposed between the substrate layer and the photocatalytic layer; and the intermediate layer is adhered to both the substrate layer and the photocatalytic layer.

These and other embodiments are described in greater detail below.

DETAILED DESCRIPTION

Figure 1:
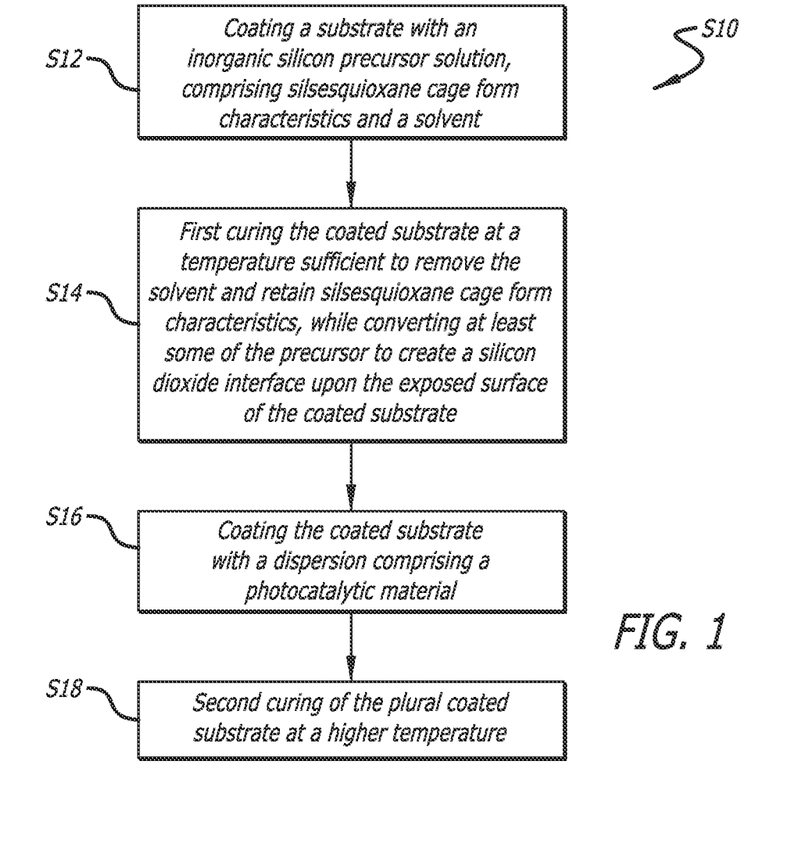
FIG. 1 is a schematic of a method described herein.

As shown in FIG. 1, the current disclosure provides a method (S10) for making a photocatalytic element. The method comprises comprising coating a substrate with an inorganic silicon oxide precursor solution. The inorganic silicon oxide precursor solution may include silsesquioxane, having cage form characteristics, and a solvent (S12). The coated substrate is cured at a temperature sufficient to remove the solvent, yet retain silsesquioxane cage-form characteristics, while converting at least some of the precursor solution to create a silicon dioxide interface upon the exposed surface of the coated substrate (S14). The method also includes coating the coated substrate with a dispersion comprising a photocatalytic material (S16). The method also includes a second curing of the plural coated substrate at a temperature sufficient to immobilize at least a portion of the photocatalytic material above the surface of the coated substrate (S18).

The photocatalytic element prepared by the method described herein may comprise a substrate, an intermediate layer comprising a silsesquioxane and silicon dioxide, and a photocatalytic layer comprising a photostable inorganic photocatalyst. The intermediate layer may be disposed between the substrate layer and the photocatalytic layer. Furthermore, the intermediate layer may be adhered to both the substrate layer and the photocatalytic layer.

The method described herein can result in a photocatalytic element that is primarily or completely inorganic. In some embodiments, the photocatalytic element contains less than 10%, less than 5%, less than 2%, less than 1%, less than 0.5%, less than 0.1%, or less than 0.01% of carbon, based upon the total number of non-hydrogen atoms present.

In some embodiments, the substrate comprises glass. The substrate may be a silicate glass or other glass typically used for glass fibers, windows and/or displays. In some embodiments, the glass substrate comprises a plurality of glass fibers. The glass substrate may comprise other types of glass known in the art.

In some embodiments, the substrate need not be capable of transmitting light. For example, the substrate may be a common industrial or household surface on which a dispersion can be directly applied. Substrates can include, glass (e.g., windows, mirrors), walls (e.g., drywall), floors, joinery, stone (e.g., granite counter tops, flooring), masonry (e.g., brick walls), metals (e.g. stainless steel, metal alloys [handles, handrails, faucets]), natural fibers (e.g., cellulose, cotton), woods (e.g., furniture, fencing, shutters), resin or plastic materials such as polycarbonates (PC), polypropylenes (PP), polyethylenes (e.g., polyethylene [PE], polyethylene terephthalates (PET), polytetrafluoroethylenes (PTFE), polyvinylidene fluorides, polyimides and polyamide-imides, perfluoralkoxy polymer resins, fluorinated ethylene propylene (FEP), ethylene tetrafluoroethylene (ETFE) (e.g. plastic wrap for flowers, plastic handles, plastic keyboards elements), other polymeric surfaces, ceramics (e.g., porcelains [bathtubs, ceramic tiles, sinks, shower stalls, toilets]) and the like. Exemplary items having such substrate surfaces include, but are not limited to, textiles, filters, refrigerators, air conditioners (including HVAC ducting), vacuum cleaners, dishwashers, lighting, humidifiers, dehumidifiers, mobile phones, plasma displays, liquid crystal displays, touch panels, touch screens, fluid storage containers, fuel tanks, motor vehicle interior surfaces. Dispersions in such embodiments can be formulated as paints, liquid adhesives, on tape, on wallpapers, on drapes, on lamp shades, on light covers, on table, floor or counter surface coverings, and the like.

In some embodiments, the substrate comprises a ceramic. A ceramic substrate can comprise $Al_2O_3$, $ZrO_2$, $SiO_2$, mullite ($3Al_2O_3.2SiO_3$), cordierite (($Mg,Fe)_2Al_4Si_5O_{18}$), or other ceramic materials. In some embodiments, the ceramic element comprises $Al_2O_3$. In some embodiments, the ceramic element comprises $ZrO_2$. In some embodiments, the ceramic element comprises $SiO_2$. In some embodiments, the ceramic element comprises mullite ($3Al_2O_3.2SiO_3$). In some embodiments, the ceramic element comprises cordierite. In some embodiments, the ceramic comprises other ceramic materials.

Any suitable silicon oxide precursor solution, including an inorganic silicon oxide precursor solution, may be used to coat the substrate. In some embodiments, the silicon oxide precursor solution can be a flowable oxide solution. In some embodiments, the precursor solution can be a liquid solution comprising an inorganic silsesquioxane precursor and a carrier solvent. In some embodiments, the inorganic silsesquioxane precursor can comprise hydrogen silsesquioxane (HSQ).

Polyhedral oligomeric silsesquioxanes (POSS) are hybrid inorganic-organic, cage-like molecules with diameters in the range of about 0.7 nm to about 3.0 nm. POSS cages have a silicon and oxygen core with the general formula $(RSiO_{3/2})_n$, where R could be a hydrogen or an organic or inorganic ligand. A hydrosilsesquioxane cage made of $n(HSiO_{3,2})_n$ units is denoted by the notation "$T_n$-POSS". Thus, octahydrosilsesquioxane, T8-POSS, consists of a cage of eight silicon atoms that are each interconnected with three cage-oxygen atoms (for a total of twelve oxygen atoms) and a single hydrogen atom outside the cage. Similarly, $(HSiO_{3/2})_{10}$, T10-POSS, contains ten silicon and fifteen oxygen atoms with each silicon attached to one hydrogen outside the cage. Dodecahedral silsesquioxane, $(HSiO_{3/2})_{12}$, T12-POSS, has twelve cage-silicon atoms and eighteen cage-oxygen atoms along with twelve hydrogen atoms attached to the cage silicon atoms. In some embodiments, the inorganic silsesquioxane precursor can be HSQ. A POSS cage can partially crosslink between cages to form a network form of POSS.

A silicon oxide precursor solution includes a solvent, such as carrier solvent, including a volatile organic solvent. A volatile organic solvent can be one that has a boiling temperature ($T_b$) less than 120° C. and/or has a flash point of less than 15° C. In some embodiments, the solvent can be methyl isobutyl ketone (MIBK [$T_b$ of about 117° C., flash point of about 14° C.]); 2-petanone (2-PN) [$T_b$ of about 102° C., flash point of about 10° C.]); methyl isopropyl ketone (MIPK [$T_b$ of about 92° C., flash point of about 5° C.]). In some embodiments, the silicon precursor solution can be selected from FOX®-1x and/or FOX®-2x flowable oxides sold by Dow Corning (Midland, Mich., USA). In some embodiments, including the "FOX®-1x" flowable oxides (e.g., FOX®-14, FOX®-15, FOX®-16, and/or FOX®-17), the carrier solvent can be methyl isobutyl ketone. In some embodiments, including the FOX®-2x flowable oxides (e.g., FOX®-22, FOX®-23, FOX®-24, and/or FOX®-25), the carrier solvent can be a volatile methyl siloxane (VMS). In addition, in some embodiments, the flowable oxide can produce different ranges of thicknesses with a single coat for a typical spin speed of about 2000-4000 rpm. For example, the range of thicknesses can be, e.g., FOX®-14 (2700-3500 Å), FOX®-15 (3800-4900 Å), FOX®-16 (5200-6700 Å), FOX®-17 (7000-9000 Å), FOX®-22 (2400-3300 Å), FOX®-23 (3200-4400 Å), FOX®-24 (4300-6000 Å), and/or FOX®-25 (5800-8100 Å).

In some embodiments, a first curing of the coated substrate can be performed at a temperature sufficient to remove the solvent. In some embodiments, the first curing of the coated substrate can be performed at a temperature sufficient to retain silsesquioxane cage form characteristics. For example, the first curing of the coated substrate can be performed at a temperature sufficient to convert at least some of the precursor to create a silicon dioxide interface upon the exposed surface of the coated substrate. The silicon dioxide interface may contain covalent bonds between the substrate and the silicon dioxide formed from the silsesquioxane. In some embodiments, the first curing of the coated substrate is at a temperature sufficient to perform one or any combination of the above results.

There can be at least four possible structural stages during the curing of HSQ films which are dependent on temperature and length of curing time. First, temperatures at room temperature up to 200° C. can result in solvent loss but substantially minimal cage-network redistribution. Second, temperatures from about 250° C. to about 350° C. can result in cage-network redistribution. Third, temperatures from about 350° C. to about 435° C. can result in Si—H thermal dissociation and network redistribution. Fourth, at temperatures greater than about 450° C. can result in the collapse of the pore structure. As the length of curing time and/or the curing temperature increases, the conversion of structural stages becomes more pronounced as energy is absorbed into the structure. In some embodiments, the curing time can vary between about 4 min to about 90 min. In some embodiments, the layer of silicon precursor can be cured at a combination of temperature and length of time so as to remove the solvent but minimize cage to network form redistribution. In some embodiments, the POSS form of the precursor solution can be between about 5% to about 0.0001% network form and between about 95% to about 99.9999% cage form. In some embodiments, the POSS form of the precursor solution can be about 5%, 4%, 3%, 2.5%, 2%, 1%, 0.5%, 0.1% network form and about 95%, 96%, 97%, 97.5%, 98%, 99%, 99.5%, 99.9% cage form.

In some embodiments, the temperature can also be sufficient to remove substantially all of the solvent from the silicon precursor solution. In some embodiments, the amount of solvent removed from the solution can be at least 80%, 90%, 95%, 96%, 97%, 97.5%, 98%, 99%, 99.5%, or 99.9%.

In some embodiments, the temperature can also be sufficient to convert at least some of the precursor to create a silicon dioxide interface upon the exposed surface of the coated substrate. In some embodiments, the amount of silsesquioxane converted to silicon dioxide can be at least 1%, 5%, 10%, 20%, 50%, 80% 95%, 96%, 97%, 97.5%, 98%, 99%, 99.5%, 99.9%.

In some embodiments, the temperature sufficient to remove the solvent and retain silsesquioxane's cage-form characteristics, while converting at least some of the precursor to create a silicon dioxide interface upon the exposed surface of the coated substrate can be at least 100° C. or at least 120° C., and/or less than about 235° C., less than about 200° C., or less than about 175° C. Curing can be carried out for any suitable amount of time, such as about 5 min to about 5 hours, about 10 min to about 1 hour, or for about 30 min. In some embodiments, curing can be carried out at a temperature of about 150° C. for about 30 min.

In some embodiments, the method can comprise coating the coated substrate surface and/or the first-cured, coated substrate surface with a dispersion, such as a dispersion comprising a photocatalytic material. Methods of applying the dispersion to a substrate can include but are not limited to: slot/dip/spin coating, brushing, rolling, soaking, melting, gluing, or spraying the dispersion on a substrate. A proper propellant can be used to spray the dispersion onto a substrate. In some embodiments, the applying of the dispersion to a coated substrate/first-cured, coated substrate can be by spin coating.

For a dispersion comprising a photocatalytic material, any desired photocatalytic material may be used, such as a tungsten oxide and cerium oxide mixture, copper oxide loaded plural phase titanium oxide, copper oxide loaded Sn/C/N doped titanium oxide, and unloaded doped titanium oxide.

Typically, the photocatalyst is photostable, meaning that its primary use is to perform photocatalytic processes other than the decomposition of the photocatalyst itself.

In some embodiments the photocatalyst material may be an inorganic solid, such as a solid inorganic semiconductor, that absorbs ultraviolet or visible light. For some materials, photocatalysis may be due to reactive species (able to perform reduction and oxidation) being formed on the surface of the photocatalyst from the electron-hole pairs generated in the bulk of the photocatalyst by absorption of electromagnetic radiation. In some embodiments, the photocatalyst can have a conduction band with an energy of about 1 eV to about 0 eV, about 0 eV to about −1 eV, or about −1 eV to about −2 eV, as compared to the normal hydrogen electrode. In some embodiments, the photocatalyst may have a valence band with an energy of about 3 eV to about 3.5 eV, about 2.5 eV to about 3 eV, about 2 eV to about 3.5 eV, or about 3.5 eV to about 5.0 eV as compared to the normal hydrogen electrode. In some embodiments, the photocatalytic material comprises a copper-loaded oxide. Suitable copper-loaded oxides are described in U.S. patent application Ser. No. 13/840,859 filed Mar. 15, 2013; and U.S. Provisional Patent Application No. 61/835,399, filed Jun. 14, 2013, which are incorporated by reference in their entireties. Copper-loaded oxides can exhibit antibacterial effects.

In some embodiments, the photocatalytic material can comprise a visible light photocatalyst. Traditionally, photocatalysts could be activated only by light in the UV regime, i.e., wavelength less than 380 nm. This is because of the wide bandgap (>3 eV) of most semiconductors. However, in recent years by appropriately selecting materials or modifying existing photocatalysts, visible-light photocatalysts have been synthesized (Asahi et al., Science, 293: 269-271, 2001 and Abe et al., Journal of the American Chemical Society, 130(25): 7780-7781, 2008). A visible-light photocatalyst includes a photocatalyst which is activated by visible light, e.g., light that is normally visually detectable by the unaided human eye and is at least about 380 nm in wavelength. In some embodiments, visible-light photocatalysts can also be activated by UV light below 380 nm in wavelength in addition to visible wavelengths. Some visible-light photocatalysts may have a band gap that corresponds to light in the visible range, such as a band gap greater than about 1.5 eV to less than about 3.5 eV, about 1.5 eV to about 3.5 eV, about 1.7 eV to about 3.3 eV, or about 1.77 eV to about 3.27 eV. Some photocatalysts may have a band gap of about 1.2 eV to about 6.2 eV, about 1.2 eV to about 1.5 eV, or about 3.5 eV to about 6.2 eV.

In some embodiments, the photocatalysts can include oxide semiconductors such as $TiO_2$, ZnO, $WO_3$, $SnO_2$, etc., and modifications thereof. Contemplated modifications include doping and/or loading. Other materials like complex oxides ($SrTiO_3$, $BiVO_4$) and some sulfides (CdS, ZnS), nitrides (GaN), and some oxynitrides (ZnO:GaN) may also display photocatalytic properties. Photocatalysts can be synthesized by those skilled in the art by a variety of methods including solid-state reaction, combustion, solvothermal synthesis, flame pyrolysis, plasma synthesis, chemical vapor deposition, physical vapor deposition, ball milling, and high-energy grinding.

In some embodiments, the photocatalyst can be an oxide semiconductor. In some embodiments, the photocatalyst can be a titanium (Ti) compound, such as a titanium oxide, oxycarbide, oxynitride, oxyhalide, or halide, including a titanium compound or oxide having an oxidation state or formal charge of +1, +2, +3, +4, +5, or +6, or an average oxidation state or formal charge of about +1 to about +6, about +2 to about +4, about +1 to about +2, or about +4 to about +6.

In some embodiments, the photocatalyst can be a tungsten (W) compound, such as a tungsten oxide, oxycarbide, oxynitride, oxyhalide, or halide, including a tungsten compound or oxide having an oxidation state or formal charge of +1, +2, +3, +4, +5, +6, +7, or +8, or an average oxidation state or formal charge of about +1 to about +8, about +4 to about +8, about +6 to about +8, or about +1 to about +4.

In some embodiments, the Ti or W compounds can be an oxide, oxycarbide, oxynitride, oxyhalide, halide, salt, doped, and/or a loaded compound. In some embodiments, the respective Ti or W compounds can be $TiO_2$, $WO_3$, or $Ti(O,C,N)_2$:Sn, such as $Ti(O,C,N)_2$:Sn wherein the molar ratio of Ti:Sn is about 90:10 to about 80:20, about 85:15 to about 90:10, or about 87:13. Suitable $Ti(O,C,N)_2$:Sn compounds are described in U.S. patent application Ser. No. 13/738,243, filed Jan. 10, 2013 (US Patent Publication No. US2013/0180932, published Jul. 18, 2013), which is incorporated by reference in its entirety. In some embodiments, the respective Ti or W compounds can be nanopowders, nanoparticles, and/or layers comprising the same. In some embodiments, the photocatalyst may include ZnO, $ZrO_2$, $SnO_2$, $CeO_2$, $SrTiO_3$, $BaTiO_3$, $In_2O_3$, $BiVO_4$, $Fe_2O_3$, ZnS, $Bi_2O_3$, and/or $Cu_xO$. $Cu_xO$ is described in U.S. patent application Ser. No. 13/840,859 which is hereby incorporated in its entirety by reference.

In some embodiments, the photocatalyst comprises $TiO_2$. In some embodiments, the photocatalyst comprises anatase $TiO_2$. In some embodiments, the photocatalyst does not include $TiO_x$. In some embodiments, the photocatalyst does not include $TiO_2$. In some embodiments, the photocatalyst comprises $WO_3$.

Any useful amount of photocatalyst may be used. In some embodiments, the photocatalyst material is at least about 0.01 molar % and less than 100 molar % of the composition. In some embodiments, the photocatalyst material is about 20 molar % to about 80 molar %, about 30 molar % to about 70 molar %, about 40 molar % to about 60 molar %, or about 50 molar % of the composition.

$TiO_2$ and $WO_3$ compounds, e.g., nanopowders, can be prepared by many different methods including thermal plasma (direct current and including radio frequency inductively-coupled plasma (RF-ICP)), solvothermal, solid state reaction, pyrolysis (spray and flame), or combustion. Radio frequency inductively-coupled plasma (e.g., thermal) methods as described in U.S. Pat. No. 8,003,563, which is hereby incorporated in its entirety by reference, may be useful because of low contamination (no electrodes), high production rates, and facile application of precursors either in the gas, liquid or solid form. Hence, radio frequency inductively-coupled plasma processes are preferred. For example, when preparing $WO_3$ nanopowders, a liquid dispersion of ammonium metatungstate in water (about 5-20 wt % solid in water) can be sprayed into the plasma volume using a two-fluid atomizer. Preferably, the precursor can be present to about 20 wt % solid in water. The plasma can be operated at about 25 kW plate power with argon, nitrogen and/or oxygen gases. The particles formed from the condensed vapor derived from the plasma can then be collected on filters. In some embodiments, the particle surface areas range as measured using BET from about 1 $m^2/g$ to about 500 $m^2/g$, about 15 $m^2/g$ to 30 $m^2/g$, or about 20 $m^2/g$. In some embodiments, the obtained $WO_3$ may be heated from about 200° C. to about 700° C. or about 300° C. to about 500° C.

In some embodiments, a photocatalyst can be doped with at least one naturally occurring element e.g. non-noble gas elements. Doped elements can be provided as precursors added generally during synthesis. Doped elements can be elements that are incorporated into the crystal lattice of the photocatalyst compound, for example as substituted within defined positions within the crystal lattice or otherwise interstitially included within the crystal. In some embodiments, the dopant can be selected from one of more elements including alkali metals like Li, Na, K, Cs; alkali earth metals like Mg, Ca, Sr, Ba; transition metals like Fe, Cu, Zn, V, Ti (for W-based compounds), W (for Ti-based compounds), Mo, Zr, Nb, Cr, Co, and Ni; lanthanide and actinide metals; halogens; Group III elements (from the Dmitri Mendeleev/Lothar Meyer style, modern periodic table with elements arranged according to increasing atomic number) including B, Al, Ga, In, and Tl; Group IV elements including Ca, Si, Ge, and Sn; Group V elements like N, P, and Bi; and Group VI elements like S and Se. In some embodiments, the photocatalyst can be doped with at least one element selected from C, N, S, F, Sn, Zn, Mn, Al, Se, Nb, Ni, Zr, Ce, or Fe. In some embodiments, the photocatalyst may be self-doped, e.g., $Ti^{3+}$ in place of $Ti^{4+}$ in a $TiO_2$ matrix. Details of suitably doped photocatalytic materials are presented in the U.S. Provisional Patent Application No. 61/587,889, which is hereby incorporated by reference in its entirety.

In some embodiments, the photocatalytic material can comprise one or more of n-type UV photocatalytic material, n-type visible-light photocatalytic material, p-type UV photocatalytic material and/or p-type visible-light photocatalytic material. In some embodiments, the n-type visible-band gap semiconductors can optionally be $WO_3$, $Ti(O,C,N)_2$:Sn, or $CeO_2$. In some embodiments, the n-type UV photocatalytic material can optionally be $CeO_2$, $TiO_2$, $SnO_2$, $SrTiO_3$, $ATaO_3$, $ANbO_3$, etc.; wherein A is an alkali metal ion and can be Ca, Ba, and/or Sr. In some embodiments, p-type visible band gap semiconductors can optionally be SiC and/or $CuMO_2$, wherein M can be Al and/or Cr. In some embodiments, the p-type UV photocatalytic material can optionally be $ZnIrO_2$, $ZnRhO_2$, CuO, NiO, $Mn_2O_3$, $Co_3O_4$, and/or $Fe_2O_3$.

In some embodiments, the photocatalyst can be loaded with at least one metal. Loaded elements can be provided by post synthesis methodologies like impregnation (Liu, M., Qiu, X., Miyauchi, M., and Hashimoto, K., *Cu(II) Oxide Amorphous Nanoclusters Grafted $Ti^{3+}$ Self-Doped $TiO_2$: An Efficient Visible Light Photocatalyst*. Chemistry of Materials, published online 2011), photo-reduction (Abe et al., Journal of the American Chemical Society, 130(25): 7780-7781, 2008), and sputtering. Loading metals on photocatalysts may be carried out as described in US Patent Publication No. US2008/0241542 which is incorporated here in its entirety by reference. In some embodiments, the loaded element is selected from noble elements. In some embodiments, the loaded element can be selected from at least one noble element, its corresponding oxide, and/or corresponding hydroxide. In some embodiments, the noble elements can be selected from Au, Ag, Pt, Pd, Ir, Ru, Rh, or their oxides and/or hydroxides. In some embodiments, the loaded element is selected from transition metals, their oxides, and/or their hydroxides. In some embodiments, the loaded element is selected from Fe, Cu, and Ni or their oxides and hydroxides. In some embodiments, the loaded elements may be chosen from different groups of elements including at least one transition metal, at least one noble metal or their respective oxides and hydroxides. In some embodiments, a suitable loaded metal oxide is described in U.S. patent application Ser. No. 13/840,859 filed Mar. 15, 2013; and U.S. Provisional Application No. 61/835,399, filed Jun. 14, 2013, which are incorporated by reference in their entireties.

In some embodiments, the photocatalytic material can comprise a co-catalyst. A co-catalyst includes a material that enhances the photocatalytic properties of a photocatalyst. In some embodiments, the co-catalyst can be a cerium oxide. In some embodiments, the co-catalyst can be $CeO_2$. In some embodiments, the photocatalytic material can comprise $WO_3$ and $CeO_2$. Co-catalysts may also be generically referred to as T-Binder throughout this document. In some embodiments, a co-catalyst may increase the rate of catalysis by a factor of at least about 1.2, at least about 1.5, at least about 1.8, at least about 2, at least about 3, or at least about 5. One method of quantifying rate of catalysis may include determining a rate of decomposition of an organic compound, such as acetaldehyde. For example, if the concentration of acetaldehyde were photocatalytically decreased to 80% of its original value after 1 hour, or by 20%, an increase in the rate of catalysis of about 2 would result in the amount of acetaldehyde being decreased to 60% of its original value after 1 hour, or by 40%. A rate of catalysis may be measured as a decrease in a compound such as acetaldehyde due to composition, at a given time point, such as about 0.5 hours, 1 hour, 1.5 hours, 2 hours, 2.5 hours, 3 hours, or 5 hours after the photocatalysis is initiated.

Some co-catalysts may be compounds or semiconductors that are capable of being reduced by electron transfer from the conduction band of the photocatalyst. For example, a co-catalyst may have a conduction band having a lower energy than the conduction band of the photocatalyst, or a co-catalyst may have a lowest unoccupied molecular orbital having a lower energy than the conduction band of the photocatalyst. When a term such as "lower energy" and "higher energy" is used to compare a band of a semiconductor or a molecular orbital with another band or molecular orbital, it means that an electron loses energy when it is transferred to the band or molecular orbital of lower energy, and an electron gains energy when it is transferred to the band for molecular orbital of higher energy.

While not intending to be bound by theory, it is believed that some metal oxides that are co-catalysts are capable of reducing $O_2$. For example, it is believed that $CeO_2$ can reduce $O_2$ gas by electron transfer. In doing so, it is believed that $Ce^{3+}$ transfers an electron to $O_2$ and is converted to $Ce^{4+}$ as a result. In a photocatalyst composition, a photocatalyst may transfer an electron to $CeO_2$, thus converting $Ce^{4+}$ to $Ce^{3+}$, and the $Ce^{3+}$ may then reduce the $O_2$. $Ce^{3+}$ may also be present as a result of equilibrium processes involving $CeO_2$ and $O_2$, and superoxide radical ion ($O_2^-$). $O_2$ and the superoxide radical ion in such an equilibrium process may be adsorbed to the surface of solid $CeO_2$ or present in the atmosphere. $Ce^{3+}$ may also be present as a result of oxidation and reduction reactions with cerium species of different oxidation states that may be added intentionally or present as impurities.

Some co-catalysts may be capable of converting atmospheric $O_2$ to a superoxide radical ion. For example, $CeO_2$ is capable of converting atmospheric oxygen to superoxide radical ion. It is believed that some of the equilibrium and/or electron transfer processes described above may contribute to this property of $CeO_2$. Such a conversion may occur under a variety of conditions, such as ambient conditions, including, for example, normal atmospheric oxygen concentrations, such as molar concentrations of about 10% to about 30%, about 15% to about 25%, or about 20% oxygen; at ambient temperature, such as about 0° C. to about 1000° C., about 0° C. to about 100° C., about 10° C. to about 50° C., or about 20° C. to about 30° C.; and pressure, such as about 0.5 to about 2 atm, about 0.8 atm to about 1.2 atm, or about 1 atm. Such a conversion may also occur under elevated or reduced temperature, pressure, or oxygen concentrations. Other materials that may be capable of reducing $O_2$ or converting atmospheric $O_2$ to a superoxide radical ion include various other materials such as $Ce_xZr_yO_2$ (where x:y is about 0.99-0.01), $BaYMn_2O_{5+\delta}$, and lanthanide-doped $CeO_2$ including $Ce_xZr_yLa_zO_2$, $Ce_xZr_yPr_zO_2$, and $Ce_xSm_yO_2$.

Some co-catalysts may have a valence band or a highest occupied molecular orbital at a higher energy than a valence band of the photocatalyst. This may allow a hole in a valence band of the photocatalyst to be transferred to a highest occupied molecular orbital or a valence band of the co-catalyst. The hole in the valence band or highest occupied molecular orbital of co-catalyst may then oxidize $H_2O$ or $OH^-$ to OH. For example, if $WO_3$ is chosen as a photocatalyst, examples of such a co-catalyst may include anatase $TiO_2$, $SrTiO_3$, $KTaO_3$, SiC, or $KNbO_3$.

In some embodiments, the co-catalyst can be inorganic. In some embodiments, the inorganic co-catalyst can be a binder. In some embodiments, the co-catalyst can be an oxide, such as a metal dioxide, including $CeO_2$, $TiO_2$, or the like. Suitable co-catalysts are described in U.S. patent application Ser. No. 13/738,243, filed Jan. 10, 2013 (US Patent Publication No. US2013/180932, published Jul. 18, 2013), which is incorporated by reference in its entirety.

In some embodiments, the co-catalyst can comprise CuO, $MoO_3$, $Mn_2O_3$, $Y_2O_3$, $Gd_2O_3$, $TiO_2$, $SrTiO_3$, $KTaO_3$, SiC, $KNbO_3$, $SiO_2$, $SnO_2$, $Al_2O_3$, $ZrO_2$, $Fe_2O_3$, $Fe_3O_4$, NiO, $Nb_2O_5$, $In_2O_5$, $Ta_2O_5$, or $CeO_2$. In some embodiments, the co-catalyst comprises $In_2O_5$, $Ta_2O_5$, anatase $TiO_2$, rutile $TiO_2$, a combination of anatase and rutile $TiO_2$, or $CeO_2$. In some embodiments, the co-catalyst comprises $TiO_2$. In some embodiments, the co-catalyst comprises anatase $TiO_2$. In some embodiments, the co-catalyst does not include $Cr_2O_3$, $CeO_2$, $Al_2O_3$, or $SiO_2$. In some embodiments, the co-catalyst does not include $Cr_2O_3$. In some embodiments, the co-catalyst does not include $CeO_2$. In some embodiments, the co-catalyst does not include $Al_2O_3$. In some embodiments, the co-catalyst does not include $SiO_2$.

In some embodiments, the co-catalyst can be $Re_rE_tO_s$, $Re_rE_tO$, or $Re_rE_tO_2$, wherein in Re is a rare earth element, E is an element or a combination of elements, and O is oxygen; and r is 1 to 2, such as about 1 to about 1.5 or about 1.5 to about 2; s is 2 to 3, such as about 2 or about 3; and t is 0 to 3, such as about 0.01 to about 1, about 1 to about 2, or about 2 to about 3. In some embodiments, the co-catalyst can be $Re_rO_s$ where Re can be a rare earth metal and r can be greater than or equal to 1 and less than or equal to 2, or can be between 1 and 2, and s can be greater than or equal to 2 and less than or equal to 3, or can be between 2 and 3. Examples of suitable rare earth elements include scandium, yttrium, and the lanthanide and actinide series elements. Lanthanide elements include elements with atomic numbers 57 through 71. Actinide elements include elements with atomic numbers 89 through 103. In some embodiments, the co-catalyst can be $Ce_xZr_yO_2$ wherein the y/x ratio=0.001 to 0.999. In some embodiments, the co-catalyst can include cerium, such as a cerium oxide including a cerium oxide having an oxidation state or formal charge of +1, +2, +3, +4, +5, or +6, or an average oxidation state or formal charge of about +1 to about +6, about +2 to about +4, about +1 to about +2, or about +4 to about +6. In some embodiments, the co-catalyst can be $CeO_a$ (a≤2). In some embodiments, the co-catalyst can be CeO. In some embodiments, the co-catalyst can be cerium oxide ($CeO_2$).

In some embodiments, the co-catalyst is $CeO_2$ doped with Sn, such as about 1 molar % to about 50 molar %, about 5 molar % to about 15 molar %, or about 10 molar % Sn, based upon the total number of moles of co-catalyst.

In some embodiments, the photocatalyst can be $WO_3$ and the co-catalyst can be $CeO_a$ (a≤2).

In some embodiments, the co-catalyst may be a Keggin unit, e.g., ammonium phosphomolybdate (($NH_4)_3$ [$PMo_{12}O_{40}$]), 12-phosphotungstic acid, silicotungstic acid, and/or phosphomolybdic acid. The overall stability of the Keggin unit allows the metals in the anion to be readily reduced. Depending on the solvent, acidity of the solution and the charge on the α-Keggin anion, it can be reversibly reduced in one or multiple electron steps.

Furthermore, it is noteworthy that the index of refraction of $CeO_2$ is substantially the same as tungsten oxide, about 90% to about 110%. In another embodiment, the index of refraction for both is about 95% to about 105%. In some embodiments, the high transparency of the photocatalytic compositions can provide a composition/layer/element of transparency greater than about 50%, 60%, 65% and/or 70%. The low scattering losses due to matched refractive indices contributes directly to a transparent composition.

Any useful ratio of photocatalyst to co-catalyst may be used. In some embodiments a photocatalytic composition may have a molar ratio (photocatalyst:co-catalyst) of about 1:5 to about 5:1, about 1:3 to about 3:1, about 1:2 to about 2:1, or about 1:1.

In some embodiments, a composition can comprise tungsten oxide and a rare earth oxide at a molar ratio of about 0.5:1 to about 2:1 or about 1:1 (tungsten oxide:rare earth oxide). In some embodiments, the rare earth oxide is cerium oxide ($CeO_2$). In some embodiments, the photocatalytic composition may include $WO_3$ and $CeO_2$, having a molar ratio ($WO_3$:$CeO_2$) of about 1:5 to about 5:1, about 1:3 to about 3:1, about 1:2 to about 2:1, or about 1:1.

In some embodiments, the dispersion can also comprise a solvent carrier to suspend, dissolve and/or disperse the photocatalytic material. In some embodiments, the dispersion solvent carrier can be an organic and/or inorganic solvent. In another embodiment, the amount of dispersing media, e.g. water, added is sufficient to attain a dispersion of about 2-50 wt %, about 10-30 wt %, and/or about 15-25 wt % solid materials. In another embodiment, the amount of dispersing media, e.g., water, added is sufficient to attain a dispersion of about 20 wt % solid materials. In some embodiments the organic solvent can be a $C_1$-$C_7$ ketone. In some embodiments, the organic solvent can be a $C_1$-$C_7$ alcohol. In some embodiments, the organic solvent can be 2-pentanone, methyl isobutyl ketone, methyl isopropyl ketone, and/or diisopropyl ketone.

In some embodiments, a second curing step can be provided in the method. In some embodiments, the curing step can be a thermal curing. In some embodiments, the thermal curing can be at a temperature sufficient to immobilize at least a portion of the photocatalytic material above the surface of the coated substrate. In some embodiments, the thermal curing can be at about 100° C. to about 450° C. In some embodiments, the thermal curing temperature can be at about 200° C., about 300° C., or about 350° C.; and up to about 400° C., about 450° C., about 500° C., or about 600° C. In some embodiments, the thermal curing temperature can be about 150° C. for about 2 hours. In some embodiments, the second curing step can be done by exposure to oxygen plasma. In some embodiments, the second curing can done be by exposure to an electron beam.

In some embodiments, the second curing of the cured coated substrate can be by non-thermal curing. In some embodiments, the non-thermal curing step can be by electron beam curing and/or oxygen plasma curing. In some embodiments, the second curing step can be by electron beam curing. In some embodiments, the electron curing can be performed by exposure to about 100 eV to about 500 eV [electron beam power]. In some embodiments, the second curing step can be by oxygen plasma curing.

In some embodiments, the method can further comprise treating of the surface, for example, the substrate or cured coated substrate surface, by, and not limited to, chemically treating, e.g., acid treating, base treating, solvent treating the surface, ozone treating, corona treating and/or heat treating the substrate surface to increase the adhesion of the coating to the substrate. Surface treatment of substrate can also be applied with use of sulfuric acid (about 10 wt % to about 60 wt %). In some embodiments, the coated substrate surface and/or the substrate surface can be treated with a corona plasma. A corona treatment apparatus (TEC™-4AX, KASUGA DENKI Inc. JAPAN) can be used at discharge power of 100 W and scan speed of 0.5 m/sec for two scans.

As a result of one or both curing steps, the intermediate layer may be mostly or entirely inorganic. For example, the silsesquioxane may be an inorganic silsesquioxane such as HSQ. Additionally, the removal of the organic materials from the intermediate layer during one or both curing steps can result in a porous intermediate layer, wherein the pores may have an average diameter of about 100 nm to about 1 μm or about 1 μm to about 100 μm.

As a result of one or both curing steps, the intermediate layer may be adhered to both the substrate layer and the photocatalytic layer. For example, the intermediate layer could be covalently bonded, fused, or otherwise adhered to these layers. In some embodiments, the intermediate layer can be covalently bonded to the substrate layer or the photocatalytic layer. For example, the silicon dioxide interface with a surface of the substrate comprises one or more covalent bonds between the silicon dioxide and the surface of the substrate. In some embodiments, the intermediate layer is covalently bonded to the substrate layer and the photocatalytic layer. In some embodiments, wherein the intermediate layer is fused to the substrate layer, the photocatalytic layer, or both.

In some embodiments, the photocatalytic coating is characterized by an adhesion of about at least 35%, at least 45%, at least 55%, at least 65%, at least 75%, at least 80%, at least 90%, at least 95%, at least 97%, or at least 99% adhesion. In some embodiments, greater than 65% (0B); between about 35% to about 65% (1B); between about 15% and about 35% (2B); between about 5% and about 15% (3B); less than about 5% (4B); and substantially no photocatalytic materials are removed from the film coating (5B). The term adhesion refers to the percentage of the coating remaining on the substrate after a standard tape removal test method for measuring adhesion. One method of ascertaining the adhesion is by the procedures described in ASTM-D3359. In some embodiments, the layers are characterized by a hardness test of at least 2H, of at least 3H, or of at least 4H. One method of ascertaining the surface hardness (scratch resistance) is by the procedures described in ASTM-3363. One method of ascertaining the surface hardness (scratch resistance) is by the scratching the surface with various implements, e.g., 2H pencils and/or thumb tacks and visually ascertaining the results.

Figure 2:
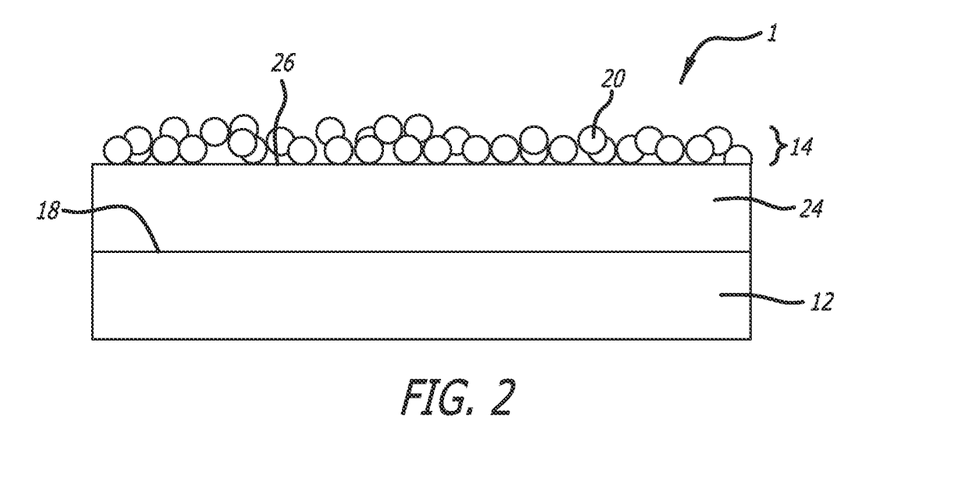
FIG. 2 is a schematic of an embodiment described herein.

As shown in FIG. 2, some embodiments include a photocatalytic element 1 including a substrate 12, a photocatalytic coating 14, and an intervening layer 24. In some embodiments, the intervening layer 24 is disposed upon, in contact with or a portion of the first surface 18 of the substrate 12. In some embodiments, the photocatalytic coating is disposed upon, in contact with or a portion of the first surface 26 of the intervening layer 24. In some embodiments, the intervening layer can be comprised of silicon dioxide/silsesquioxane precursors. The photocatalytic coating 14 can be comprised of photocatalytic material including photocatalysts, co-catalysts, dopants, solvents, and/or loaded material. In some embodiments, the substrate 12 can comprise a treated substrate surface 18. In some embodiments, the treated substrate surface 18 may be a porous surface. In some embodiments, the photocatalytic coating 14 can include a photocatalytic material 20 disposed in and/or upon the intervening layer 24. In some embodiments, a sufficient amount of the photocatalytic material 20 is exposed on the surface of the photocatalytic coating to provide a desired antibacterial effect.

Figure 3:
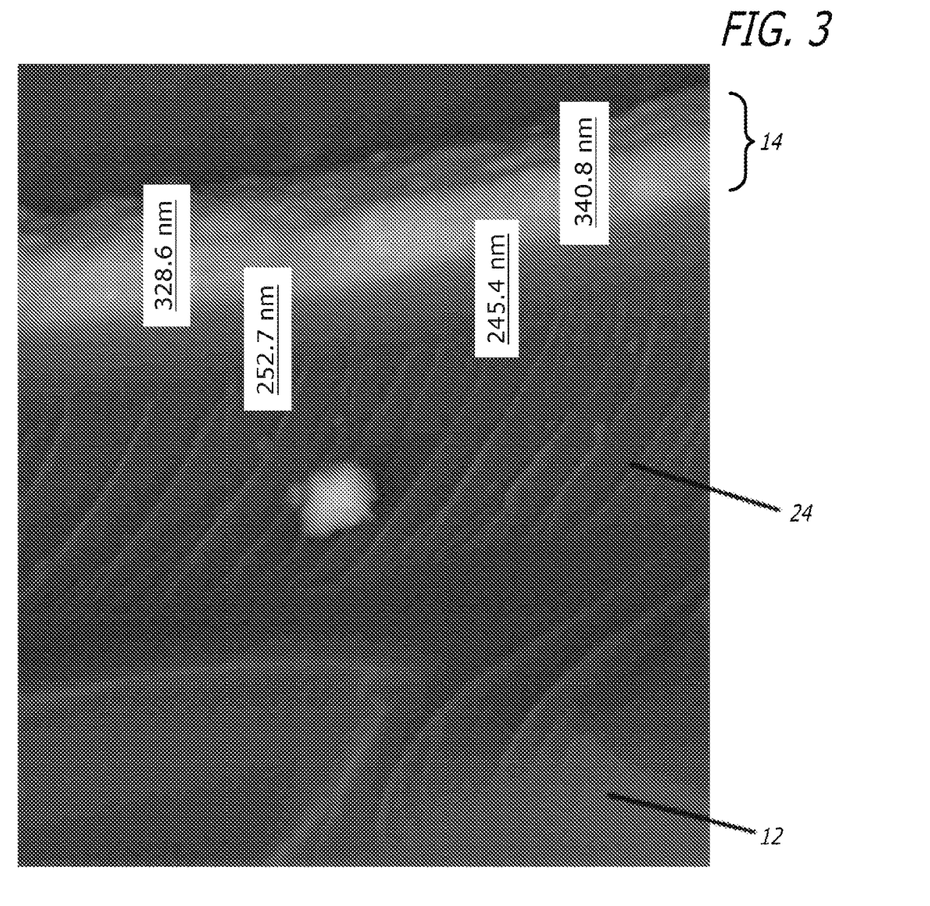
FIG. 3 is a Scanning Electron Microscope (SEM) surface image of an embodiment (Example 1) on a glass substrate.

FIG. 3 is an SEM of image of a photocatalytic element embodiment on a glass substrate. As shown in FIG. 3, the photocatalytic coating 14 can be disposed upon the intervening layer 24, which is disposed upon the substrate 12.

EXAMPLES

It has been discovered that embodiments of photocatalytic elements described herein improve the adhesion of a photocatalytic material to a substrate. These benefits are further shown by the following examples, which are intended to be illustrative of the embodiments of the disclosure, but are not intended to limit the scope or underlying principles in any way.

Example 1

For Example 1 (EX-1), a commercially available glass slide (3×1 inches) was used as a substrate for a photocatalytic coating. The glass slide substrate was cleaned with acetone (Sigma Aldrich, St. Louis, Mo., USA) and isopropyl alcohol (Aldrich) and then dried. The cleaned glass slide substrate was subjected to corona discharge treatment to increase the hydrophilicity of the substrate surface for good wettability of the coating suspension. A corona treatment apparatus (Electro Technic Products, Inc., Chicago, Ill., USA) was used at discharge power of 500 W and scan speed of 0.5 m/sec for about 30 sec.

A commercially available flowable oxide solution (hydrogen silsesquioxane/methylisobutylketone [methyl isobutyl ketone] [MIBK] [sold under the brand name FOX®-17, by Dow Corning, Midland, Mich., USA]) was continually added drop wise to the substrate and spin coated on the cleaned, corona-treated substrate for about 30 sec at about 1500 rpm and then about 2 min at about 2000 rpm.

The resulting coated substrate was then cured at 150° C. for about 30 min on a hot plate resulting in a dried coating over the substrate.

Next, the photocatalytic layer was prepared. A $WO_3$ photocatalyst (200 mg)—prepared according to the method described in US Patent Publication No. 2013/738243 (which is incorporated by reference in its entirety) and U.S. Pat. No. 8,003,563—was added to water. The resulting dispersion was then added to 740 mg of $CeO_2$ sol (Nissan Chemical America, Houston, Tex., USA, NanoUse® CE-20B). The mole ratio of $CeO_2$ and $WO_3$ was chosen to be 1:1 (50 molar % to 50 molar %). Then a sufficient amount of RO (reverse osmosis treated) water (800 mg) was added to the resulting dispersion in order to make a coating solution which was about 20 wt % solid materials in water. The resulting dispersion was homogenized using an ultrasonic homogenizer. The coated glass substrate (50 mm×75 mm) was coated with the prepared resultant by using a spin coater (1500 rpm/40 sec). The coated substrate was heated for about 2 hours at about 400° C. in a box oven under an ambient atmosphere resulting in a coated substrate that was a photocatalytic element embodiment.

Example 2

The coated substrate of Example 2 (EX-2) was prepared in a similar manner as described in Example 1, except that the coated substrate was finally annealed for about 2 hours at 150° C. on a hot plate instead of in a box oven at about 400° C.

Comparative Example 1

The coated substrate of Comparative Example 1 (CE-1) was prepared in a similar manner as described in Example 1, except that the photocatalytic layer consisting of $WO_3$/$CeO_2$ and silicone material was directly spin coated on the cleaned and corona treated glass slide (i.e., no FOX®-17 intervening layer) before annealing at 400° C. in the box oven.

Comparative Example 2

Comparative Example 2 (CE-2) was prepared in a manner similar to Comparative Example 1, except that the $WO_3$/$CeO_2$ layer was directly spin coated onto the clean and corona treated glass substrate before annealing at 400° C. in the box oven.

Example 3

Figure 4:
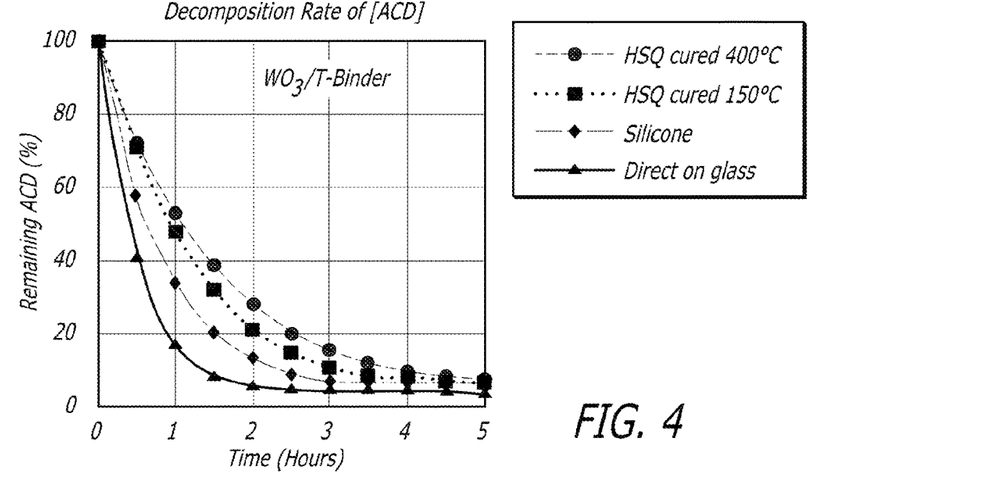
FIG. 4 is a graph showing the volatile organic compound decomposition activity of an embodiment described herein (Examples 1, 2, 3, 4, and 5) under blue light.

The spin coated glass slides prepared in accordance with Examples 1 and 2 as well as Comparative Examples 1 and 2, were heated at about 120° C. on a hot plate under full spectrum irradiation by a Xe lamp (lamp power output about 300 W) for about 1 hour. Each slide was then sealed in a separate 5 L Tedlar® bag under vacuum, followed by injecting about 3 L of ambient air and about 80 mL of 3500 ppm acetaldehyde. Next, each bag was lightly massaged for about 2 mins by hand and then placed in the dark for about 15 min. The acetaldehyde concentration was estimated by Gas Chromatagraphy-Flame Ionization Detector (GC-FID) (Shimadzu, Model GC 210+) to be at about 80±2 ppm. Each Tedlar® bag containing a sample was placed back in the dark for about 1 hour. The slide/Tedlar® bag was then exposed to array blue LED of 455 nm with light intensity of 50 mW/cm². A sample was collected every 30 mins by an automated injection port of GC-FID and the amount of remaining acetaldehyde was estimated at subsequent 30 min intervals. FIG. 4 is a graph illustrating embodiments described above performance data. The top line in the graph represents HSQ cured at 400° C. The second line down from the top represents HSQ cured at 150° C. The third line down from the top represents silicone. The graph shows that generally when a coated substrate is made as described above performance is at least comparable when compared to bare silicon.

Coating hardness for each example was evaluated by depressing a 2H pencil or a thumbtack across the surface of the glass substrates. The results are shown in Table 1.

TABLE 1

Coating Hardness Evaluation

| Example | 2H pencil | thumbtack |
| --- | --- | --- |
| EX-1 | No scratch | No scratch |
| EX-2 | No scratch | scratch |
| CE-1 | scratch | scratch |
| CE-2 | scratch | scratch |

EMBODIMENTS

The following embodiments are specifically contemplated:

Embodiment 1

A method for making a photocatalytic element comprising:
(a) coating a substrate with an inorganic silicon oxide precursor solution, comprising a silsesquioxane having predominantly cage form characteristics, and a solvent;
(b) a first curing of the coated substrate at a temperature sufficient to remove the solvent and retain silsesquioxane cage form characteristics;
(c) coating the coated substrate with a dispersion comprising a photocatalytic material to form a plural coated substrate; and
(d) a second curing of the plural coated substrate at a temperature sufficient to immobilize at least a portion of the photocatalytic material above the surface of the coated substrate;
(e) wherein at least some of the silsesquioxane is converted to create a silicon dioxide interface with the substrate as a result of the first curing or the second curing.

Embodiment 2

The method of embodiment 1, wherein the silicon oxide precursor solution is a flowable oxide solution.

Embodiment 3

The method of embodiment 1 or 2, wherein the solvent is selected from methyl isobutyl ketone, 2-pentanone, methyl isopropyl ketone and diisobutyl ketone.

Embodiment 4

The method of embodiment 1, 2, or 3, wherein the inorganic silicon precursor solution is FOX-17.

Embodiment 5

The method of embodiment 1, 2, 3, or 4, wherein the first curing step is carried out at less than 235° C. for about 4 min to about 90 min.

Embodiment 6

The method of embodiment 6, wherein the first curing step is carried out at less than about 235° C. for about 30 min.

Embodiment 7

The method of embodiment 1, 2, 3, 4, 5, or 6, wherein the second curing step is by thermal curing, exposure to an oxygen plasma source, or exposure to an electron beam.

Embodiment 8

The method of embodiment 7, wherein the second curing is by thermal curing at about 100° C. to about 450° C.

Embodiment 9

The method of embodiment 1, 2, 3, 4, 5, 6, 7, or 8, wherein the second curing is by thermal curing at about 200° C. to about 600° C.

Embodiment 10

The element of embodiment 1, 2, 3, 4, 5, 6, 7, 8, or 9, wherein the photocatalytic material is selected from copper oxide loaded plural-phase titanium oxide, copper oxide loaded Sn/C/N-doped titanium oxide, and unloaded doped titanium oxide.

Embodiment 11

The method of embodiment 1, 2, 3, 4, 5, 6, 7, 8, 9, or 10, wherein the photocatalytic material comprises $WO_3$ and $CeO_2$.

Embodiment 12

The method of embodiment 1, comprising spin-coating the substrate or the coated substrate.

Embodiment 13

The method of claim 1, wherein the photocatalytic element contains less than 1% of carbon, based upon the total number of non-hydrogen atoms present.

Embodiment 14

A photocatalytic element made according to the method of embodiment 1, 2, 3, 4, 5, 6, 7, 8, 9, 10, 11, 12, or 13.

Embodiment 15

A photocatalytic element comprising:
a substrate;
an intermediate layer comprising a silsesquioxane and silicon dioxide; and
a photocatalytic layer comprising a photostable inorganic photocatalyst;
wherein the intermediate layer is disposed between the substrate layer and the photocatalytic layer; and
the intermediate layer is adhered to both the substrate layer and the photocatalytic layer.

Embodiment 16

The photocatalytic element of embodiment 15, wherein the photocatalytic layer comprises $WO_3$.

Embodiment 17

The photocatalytic element of embodiment 15 or 16, wherein the photocatalytic layer further comprises $CeO_2$.

Embodiment 18

The photocatalytic element of embodiment 15, 16, or 17, wherein the silsesquioxane comprises hydrogen silsesquioxane.

Embodiment 19

The photocatalytic element of claim 15, 16, 17, or 18, wherein the silsesquioxane is inorganic.

Embodiment 20

The photocatalytic element of embodiment 15, 16, 17, 18, or 19, wherein the intermediate layer comprises a silicon dioxide interface with a surface of the substrate.

Embodiment 21

The photocatalytic element of claim 15, 16, 17, 18, 19, or 20, wherein the intermediate layer is covalently bonded to the substrate layer or the photocatalytic layer.

Embodiment 22

The photocatalytic element of claim 21, wherein the intermediate layer is covalently bonded to the substrate layer and the photocatalytic layer.

Embodiment 23

The photocatalytic element of claim 15, 16, 17, 18, 19, 20, 21, or 22, wherein the intermediate layer is fused to the substrate layer or the photocatalytic layer.

Embodiment 24

The photocatalytic element of claim 15, 16, 17, 18, 19, 20, 21, 22, or 23, wherein the intermediate layer is porous.

Embodiment 25

The photocatalytic element of claim 15, 16, 17, 18, 19, 20, 21, 22, 23, or 24, wherein the photocatalytic element contains less than 2% of carbon, based upon the total number of non-hydrogen atoms present.

Embodiment 26

The method of embodiment 1, 2, 3, 4, 5, 6, 7, 8, 9, 10, 11, 12, or 13, wherein the silicon dioxide interface with a surface of the substrate comprises one or more covalent bonds between the silicon dioxide and the surface of the substrate.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained. At the very least, and not as an attempt to limit the application of the doctrine of equivalents to the scope of the claims, each numerical parameter should at least be construed in light of the number of reported significant digits and by applying ordinary rounding techniques.

The terms "a," "an," "the" and similar referents used in the context of describing the invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of any claim. No language in the specification should be construed as indicating any non-claimed element essential to the practice of the invention.

Groupings of alternative elements or embodiments disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, the claims include all modifications and equivalents of the subject matter recited in the claims as permitted by applicable law. Moreover, any combination of the above-described elements in all possible variations thereof is contemplated unless otherwise indicated herein or otherwise clearly contradicted by context.

In closing, it is to be understood that the embodiments disclosed herein are illustrative of the principles of the claims. Other modifications that may be employed are within the scope of the claims. Thus, by way of example, but not of limitation, alternative embodiments may be utilized in accordance with the teachings herein. Accordingly, the claims are not limited to embodiments precisely as shown and described.

What is claimed is:

1. A photocatalytic element comprising:
   a substrate;
   an intermediate layer comprising a silsesquioxane and silicon dioxide; and
   a photocatalytic layer comprising a photostable inorganic photocatalyst;
   wherein the intermediate layer is porous and disposed between the substrate and the photocatalytic layer; and
   the intermediate layer is adhered to both the substrate and the photocatalytic layer.

2. The photocatalytic element of claim 1, wherein the photocatalytic layer comprises $WO_3$.

3. The photocatalytic element of claim 2, wherein the photocatalytic layer further comprises $CeO_2$.

4. The photocatalytic element of claim 1, wherein the silsesquioxane comprises hydrogen silsesquioxane.

5. The photocatalytic element of claim 1, wherein the silsesquioxane is inorganic.

6. The photocatalytic element of claim 1, wherein the intermediate layer comprises a silicon dioxide interface with a surface of the substrate.

7. The photocatalytic element of claim 1, wherein the intermediate layer is covalently bonded to the substrate or the photocatalytic layer.

8. The photocatalytic element of claim 1, wherein the intermediate layer is covalently bonded to the substrate and the photocatalytic layer.

9. The photocatalytic element of claim 1, wherein the intermediate layer is fused to the substrate or the photocatalytic layer.

10. The photocatalytic element of claim 1, wherein the photocatalytic element contains less than 2% of carbon, based upon the total number of non-hydrogen atoms present.

* * * * *